US008579155B2

(12) United States Patent
Malachowsky et al.

(10) Patent No.: US 8,579,155 B2
(45) Date of Patent: Nov. 12, 2013

(54) METHOD AND SYSTEM FOR MAKING AND VENDING ICE

(76) Inventors: Michael William Malachowsky, Portland, OR (US); Jeffrey Wayne Malachowsky, Portland, OR (US); Chris Alan Malachowsky, Los Altos, CA (US)

( * ) Notice: Subject to any disclaimer, the term of this patent is extended or adjusted under 35 U.S.C. 154(b) by 1209 days.

(21) Appl. No.: 11/800,898

(22) Filed: May 7, 2007

(65) Prior Publication Data
US 2007/0210105 A1    Sep. 13, 2007

Related U.S. Application Data

(62) Division of application No. 11/114,348, filed on Apr. 25, 2005, now Pat. No. 7,428,824.

(51) Int. Cl.
*B67B 7/00* (2006.01)
*F25C 1/00* (2006.01)

(52) U.S. Cl.
USPC ............. 222/1; 22/144.5; 22/146.6; 62/66; 62/344

(58) Field of Classification Search
USPC ............... 222/1, 144.5, 144.6, 146.6; 62/66, 62/340–356, 389–400
See application file for complete search history.

(56) References Cited

U.S. PATENT DOCUMENTS

| | | | |
|---|---|---|---|
| 4,328,539 A | 5/1982 | Heeger | |
| 4,423,830 A | 1/1984 | Lents et al. | |
| 4,896,513 A | 1/1990 | Troscinski | |
| 4,990,169 A | 2/1991 | Broadbent | |
| 5,229,427 A | 7/1993 | Madaj | |
| 5,501,367 A | 3/1996 | Chigira | |
| 6,513,337 B1 * | 2/2003 | Astvatsatrian et al. | 62/66 |
| 6,672,097 B1 * | 1/2004 | Ashley | 62/340 |
| 6,698,228 B2 | 3/2004 | Kateman et al. | |
| 6,698,229 B2 | 3/2004 | Renken et al. | |
| 6,827,529 B1 | 12/2004 | Berge et al. | |

* cited by examiner

*Primary Examiner* — Kevin P Shaver
*Assistant Examiner* — Donnell Long

(57) ABSTRACT

A vending machine is disclosed. The vending machine has a selector for a plurality of beverage types and a selector for a plurality of ice types. The vending machine has a first store for storing a supply of the plurality of beverage types and a second store for storing a supply of the plurality of ice types. The vending machine also has a dispenser for dispensing into a container a selected beverage type and a selected ice type.

20 Claims, 11 Drawing Sheets

METHOD AND SYSTEM FOR MAKING AND VENDING ICE

RELATED APPLICATIONS

The present application is a divisional application of and claims the benefit of U.S. patent application Ser. No. 11/114,348, filed Apr. 25, 2005, now U.S. Pat. No. 7,428,824, entitled "METHOD AND SYSTEM FOR MAKING AND VENDING ICE," naming Michael Malachowsky, Jeffery Malachowsky, and Chris Malachowsky as inventors. That application is incorporated herein by reference in its entirety and for all purposes.

BACKGROUND OF THE INVENTION

Today, it is common place to find beverage dispensing machines in various establishments such as movie theaters, convenience stores, restaurants, fast food establishments, sports venues, and the like. Many of these beverage dispensing machines have ice dispensers integrated into them, allowing a person to fill a container with ice, and then, while at the same machine, fill the container with a selected beverage.

These combination beverage and ice dispensing machines are popular, because they are convenient and efficient. Everything needed to fill a beverage container is centrally located in a single machine. A user simply needs a container and the machine provides the beverage along with the ice to cool the beverage with.

Often these machines contain many selections for dispensing beverages. As an example, a single machine might dispense water, tea, juice, lemonade, sports drink, and a variety of carbonated sodas, along with ice. Many machines are so large that they have also multiple ice dispensers, so that more than one user can be filling a cup or container with ice at a time. Some machines make the ice that they dispense, while some have a large storage area for holding and dispensing ice that is made elsewhere and then added to the machine.

The ice dispensed by these machines serves an important function, namely cooling the beverages dispensed by the machines. As the ice cools the beverages, it melts. Insulated containers slow the melting, but do not stop it. Melting ice creates water, and this water is added to the beverage. Eventually, as enough ice melts into water, the beverage containing the ice becomes diluted, or watered down, and may no longer taste like the beverage and sometimes may not have an appealing taste.

SUMMARY OF THE INVENTION

A method and system for making and vending ice are described. A vending machine comprising a selector for a plurality of beverage types and a selector for a plurality of ice types are described. The vending machine has a first store for storing a supply of the plurality of beverage types and a second store for storing a supply of the plurality of ice types. The vending machine also has a dispenser for dispensing into a container a selected beverage type and a selected ice type. The ice types may be pre-frozen and stored for dispensing or they can be flash frozen at the time of dispensing.

In one embodiment, the vending machine may dispense a plurality of soda flavors and other beverages and each beverage may have a corresponding ice or flavored ice that matches the beverage. The matching ice may be dispensed into the same container as the soda, or a user may mix flavors of ice and soda.

In another embodiment, the ice types may differ in color as well as flavor. In other embodiments, the ice types may differ in buoyancy and may contain different colored and/or flavored centers.

The flavored ice may also be dispensed as crushed ice or in block or globe shape. In sports drinks, the ice may contain electrolytes and/or other supplements. In adult embodiments, the liquid beverage may be a mixer with the ice types differentiated by containing different alcohols.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
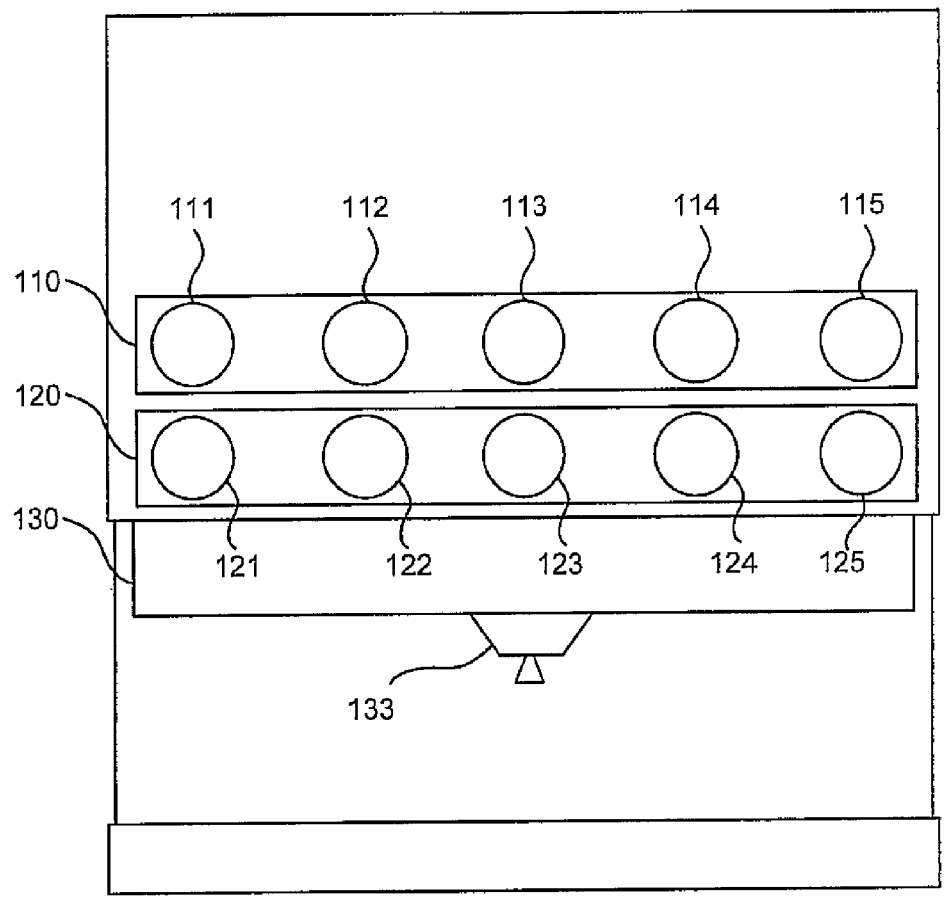
FIG. 1 is a front elevation of a vending machine, in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

An overview of the invention is presented herein, and also a preview of terms that will be used is discussed. An overview of the operation of a vending machine and some of the components connected therewith are presented. Specific features such as ice and beverage selection and dispensing are presented, and ice making in conjunction with embodiments of the present invention is discussed. A method for making ice in accordance with embodiments of the present invention is also presented.

When ice in a beverage melts, it creates water, and this water is added to the beverage. Eventually, as enough ice melts into water, the beverage containing the ice becomes diluted, or watered down, and may not have an appealing taste. Watered down drinks can be annoying, because the flavor is not as enjoyable. Accordingly, what is needed is a way to cool beverages with ice, so that as the ice melts, the cooled beverage containing the ice does not become watered down, but instead becomes improved in flavor or improved in some other quality by the presence of or the melting of the ice. An ice enhanced with other characteristics such as color, flavor, buoyancy, or other enhancements, would instill new qualities in the beverage as the ice melted. A machine that made and/or vended such enhanced ice and the related beverage liquids would be a useful thing. Embodiments of the present invention describe a method for making enhanced ice, a machine to make it with, and a machine to vend it with.

Certain terms such as "beverages," "ice," "plain ice," "enhancing agent," and "enhanced ice," are used as various embodiments of the current invention are described. The term "beverage" as used herein generally refers to a liquid for human consumption. Many beverages such as soda, juice, tea, milk, coffee, ice tea, lemonade, punch, alcohol, sports drink, or water come to mind, however, it should be understood that they do not comprise an exclusive list of the beverages that could be used in the embodiments of the present invention. The term "ice" as commonly used, means frozen water. However, in the descriptions of the various embodiments of the present invention, the term "ice" is also used generically to refer to a plurality of human consumable frozen liquids that may be flavored, colored, or enhanced with supplements, etc. Where appropriate, the term "plain ice" is used when referring specifically to ice consisting only of frozen water. The term "enhancing agent" as used herein refers to an agent that is mixed with a liquid prior to freezing, wherein the purpose of the agent is to add to the properties of the liquid in some way. Things such as beverage syrup, food coloring, caffeine, alcohol, flavoring, and nutritional supplements such as electrolytes are capable of being used as enhancing agents, but by no means do these items comprise an exclusive list. The term "enhanced ice" as used in the descriptions of the various embodiments of the present invention, refers to a liquid that has been mixed with one or more enhancing agents and then frozen. The descriptions of the terms above are provided to give a framework for discussing the embodiments of the invention, but are not meant to limit the spirit and scope of the embodiments of the invention as described below.

In FIG. 1 a front elevation of a vending machine 100, in accordance with one embodiment of the present invention, is shown. FIG. 1 shows one embodiment of a vending machine 100 for vending a plurality of beverages and a plurality of ice types. The vending machine 100 of FIG. 1 has a beverage selector 120 for selecting the type of beverage, from a plurality of beverages, to be dispensed. It also has an ice selector 110 for selecting the type of ice, from a plurality of ice types, to be dispensed. It also has a dispenser 130 to dispense the selected beverage types and ice types through a dispensing device 133. While only one dispensing device 133 is shown in this embodiment, it should be understood that a plurality of dispensing devices could be used in conjunction with embodiments of the present invention. For instance, in one embodiment, a single dispensing device 133 could be used to dispense a plurality of ice types, while a plurality of dispensing devices 133 could be used to dispense each of a plurality of beverages. In another embodiment, a single dispensing device 133 could be used to dispense a plurality of beverages, while a plurality of dispensing devices 133 could be used to dispense each of a plurality of ice types.

Figure 2:
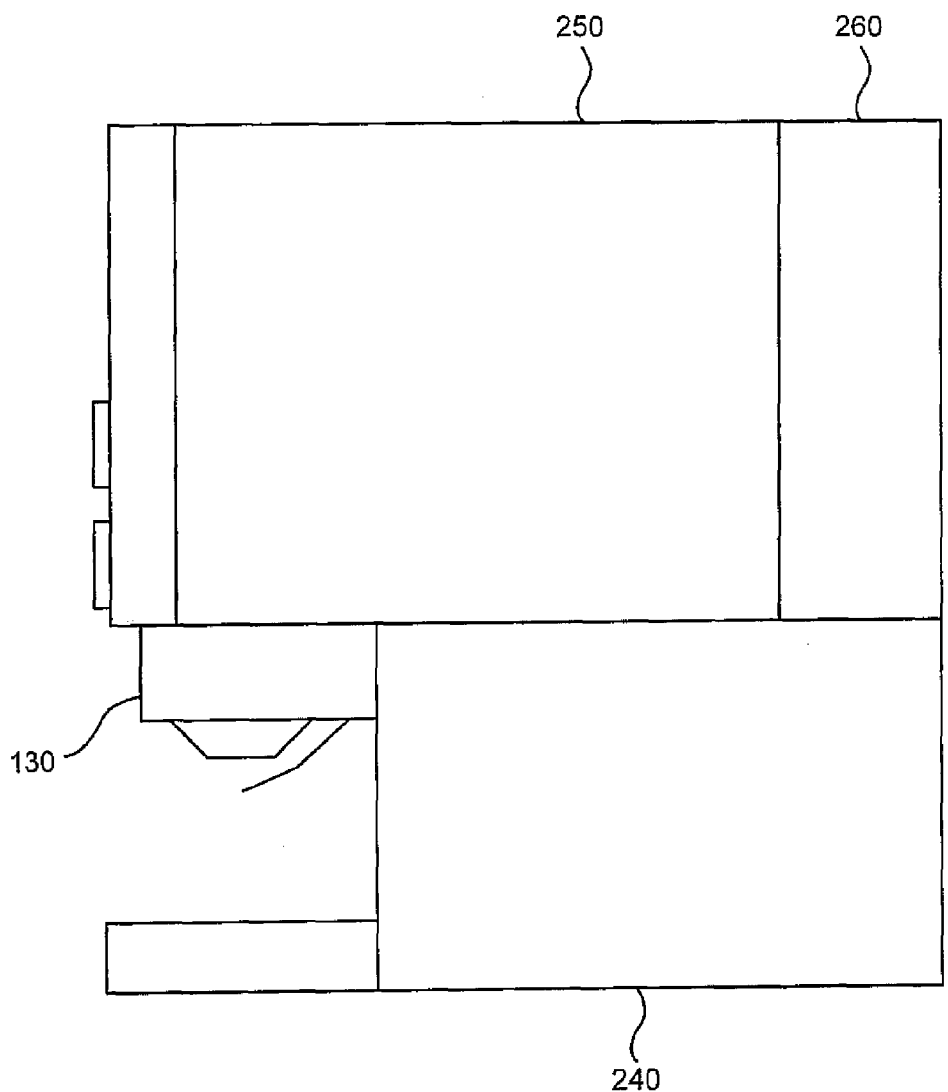
FIG. 2 is a right side elevation of a vending machine, in accordance with one embodiment of the present invention.

In FIG. 2 a right side elevation of a vending machine 100, in accordance with one embodiment of the present invention, is shown. In the embodiment shown, the vending machine 100 has a beverage store 240 for storing a plurality of different beverages types and an ice store 250 for storing a plurality of different ice types. Though FIG. 2 shows the beverage store 240 as part of the vending machine 100, it should be understood that in some embodiments, the beverage store 240 can be separate from the vending machine 100. For instance, in one embodiment, the beverage store 240 is simply an area where hoses connected to various beverages and/or beverage syrups and/or enhancing agents and/or supplements enter the vending machine 100 to connect with the dispenser 130 and/or ice making mechanism 260. It should also be understood that in some embodiments, the beverage store also stores enhancing agents and/or supplements that can be frozen into ice or dispensed. Though not shown, a separate internal or external store for storing enhancing agents and/or supplements is provided in some embodiments of the present invention. In one embodiment, the dispenser 130 dispenses the selected beverage types from the beverage store 240 and the selected ice types from the ice store 250. In other embodiments, the enhanced ice is flash frozen as needed for dispensing. In these embodiments, the ice store 250 may not be required at all.

In one embodiment, the vending machine 100 also has a mechanism 260 for making ice by freezing one of the beverage types and storing the ice in the ice store 250. In one embodiment, the mechanism 260 freezes a beverage from the beverage store 240 directly into ice for storage in the ice store 250. In another embodiment, the mechanism 260 operates in the same manner, but makes a plurality of ice types from a plurality of beverage types, and stores the plurality of ice types in the ice store 250. In yet another embodiment, the mechanism 260 freezes one or more beverages from the beverage store 240 into ice types for storage in the ice store 250, but also adds an enhancing agent such as a flavor, color, stimulant, or nutritional supplement before freezing. In yet another embodiment the freezing mechanism flash freezes ice from beverages vended by the vending machine 100, utilizing liquid nitrogen or carbon dioxide gas to facilitate the flash freezing. The flash frozen ice types are created on demand and dispensed immediately without being stored. In another embodiment, some ice types are stored in the ice store 250, while others are flash frozen as needed.

With reference again to FIG. 1, in one embodiment, the beverage selector 120 comprises a plurality of buttons 121-125. Each button (121, 122, 123, 124, & 125) corresponds to a different type of beverage that can be selected for dispensing from the beverage store 240 of the vending machine 100. Although five beverage selector buttons 121-125 are shown, it should be known that there can be more or less, depending on the number of different beverage types to be offered for vending. One beverage selector button (125 for instance) can be selected to dispense one beverage type, or multiple beverage selector buttons (123, 124, & 125 for instance) can be selected to dispense multiple beverage types. It should be understood that other devices for selecting a type of beverage can be used in other embodiments of the present invention, even though they are not represented in the embodiment shown in FIG. 1. For instance, in one embodiment standard soda fountain heads, as generally known and used in the industry, are used to integrate the beverage selector 120 with the dispenser 130. In such an embodiment, shown in FIG. 4, beverage types are dispensed from separate devices than ice types.

With reference again to FIG. 1 and to FIG. 2, in one embodiment, the ice selector 110 comprises a plurality of buttons 111-115. Each ice selector button (111, 112, 113, 114, & 115) corresponds to a different type of ice (plain ice, a beverage frozen into ice, or enhanced ices) that can be selected for dispensing from the ice store 250 of the vending machine 100. Although five ice selector buttons (111-115) are shown, it should be known that there can be more or less, depending on the number of different ice types to be offered for vending. One, button (115 for instance) can be pressed to dispense one ice type, or multiple buttons (113, 114, & 115 for instance) can be pressed to dispense multiple ice types. It should be understood that other devices for selecting a type of ice can be used in other embodiments of the present invention, even though they are not represented in the embodiment shown in FIG. 1.

In one embodiment, the selectors 110 and 120 may be implemented as a rotatable knob having various positions similar to hours in an analog clock face. Each position would correspond to a different selection and a single push button would trigger the selection. Various other selectors may be used, e.g., on-screen icons, mechanical, and electrical selectors.

The dispenser 130 shown in FIG. 1 utilizes a combined dispensing device 133 that dispenses both a selected beverage type and a selected ice type. In an embodiment using this combination dispensing device 133, a container has to be positioned only once to fill it with selected beverage types and selected ice types. In another embodiment the dispenser 130 in the vending machine 100 is comprised of a plurality of these combination dispensing devices 133. In yet another embodiment of the present invention, a single dispensing device dispenses a plurality of different ice types, while one or more other dispensing devices dispense selected beverage types. In yet another embodiment, separate dispensing devices for each beverage type and each ice type vended by the vending machine 100 are utilized. In still another embodiment, a single device is used to dispense selected beverage types, and one or more devices are used to dispense selected ice types.

Figure 3:
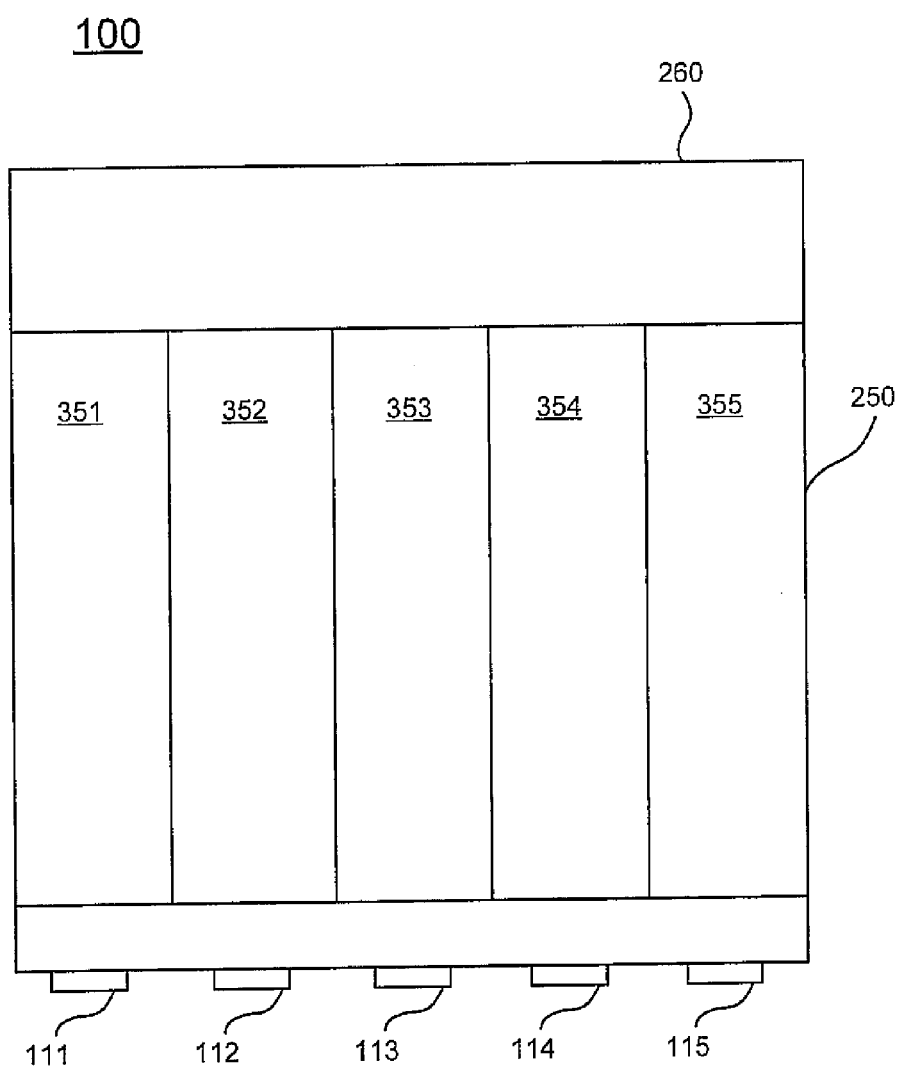
FIG. 3 is a top plan view of a vending machine, in accordance with one embodiment of the present invention.

Referring now to FIG. 1 and FIG. 3. In FIG. 3 a top plan view of a vending machine 100, in accordance with one embodiment of the present invention, is shown. FIG. 3 shows a top view of a mechanism 260 for making a plurality of ice types. In the embodiment shown, the mechanism 260 is used to freeze water into plain ice and store it in the ice store 250. In the embodiment shown, the mechanism 260 is also used to make one or more ice types by freezing the different beverage types available from the vending machine 100 into ice types to be stored in the ice store 250 for dispensing through the dispenser 130, when selected via the ice selector 110. FIG. 3 also shows top view of an ice store, or hopper, 250 that is segmented into various areas (351-355) to store a plurality of different ice types. Five segmented areas, or smaller hoppers, (351, 352, 353, 354, & 355) are shown, but it should be known that there could be more areas or less, depending on how many different ice types are to be stored or vended. In the embodiment shown, the vending machine 100 makes the ice types that are stored and dispensed as selected via the use of the ice selector buttons (111, 112, 113, 114, & 115). In other embodiments the ice types are made external to the vending machine 100 and loaded into the ice store 250 for storage and dispensing when selected with by an ice selector button 111-115.

In one embodiment, the mechanism 260 of FIG. 3 also has a combiner stage that mixes in enhancing agents, such as food coloring, caffeine, flavoring, nutritional supplements, alcohol, other beverages, or beverage syrup with the beverages before freezing. In another embodiment, the mechanism 260 also has a molding stage that inserts the beverage or mixture into molds to freeze into various known ice shapes, or into fancy shapes such as star shapes, animal shapes, rocket shapes, multi-layered ice types, or ice types with hollow centers that can be filled with air, an alcohol, a liquid, or an enhancing agent. In yet another embodiment, the mechanism 260 also has a crusher that crushes a portion of the ice so that finer ice, or even shaved ice can be selected and dispensed immediately after crushing, or stored in the ice store 250 for later selection and dispensing. By crushing and/or shaving a portion of the ice, products like snow cones can be offered that have enhanced features. For instance, a white snow cone with coconut flavoring could be created that was interspersed with small bits of strawberry flavored enhanced ice. Over time, such a snow cone would change colors and flavors.

Figure 4:
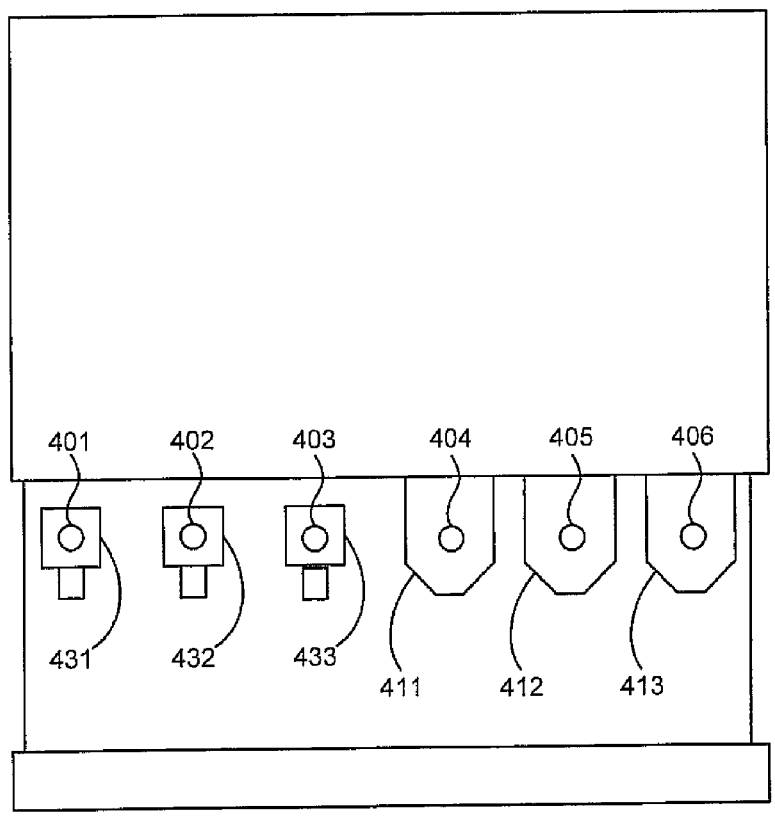
FIG. 4 is a front elevation of a vending machine, in accordance with one embodiment of the present invention.

FIG. 4 shows a front elevation of a vending machine 400, in accordance with one embodiment of the present invention. Vending machine 400 works the same way as vending machine 100, but utilizes different ice and beverage selectors and dispensers. The vending machine 400 of FIG. 4 has three beverage dispensers (431, 432, and 433) and three ice dispensers (411, 412, and 413). Other embodiments could contain a greater or lesser number of drink dispensers and/or ice dispensers depending on how many beverage types and ice types were to be dispensed by the vending machine 400. Each beverage dispenser (431, 432, and 433) has a button (401, 402, and 403) and each ice dispenser 411, 421, and 413) has a button (404-406) on the front of it that causes that dispenser to dispense when the button is pressed. In another embodiment, each dispenser (411, 412, 413, 431, 432, and 433) can be activated by a lever or by some other means. A container can be filled with a selected ice type by placing it under a selected ice type dispenser (411 for instance) and pressing the button (404 for instance) associated with that ice type dispenser, and it can be filled with a selected beverage type by placing it under a selected beverage type dispenser (431 for instance) and pressing the button (401 for instance) associated with that beverage dispenser.

Figure 5:
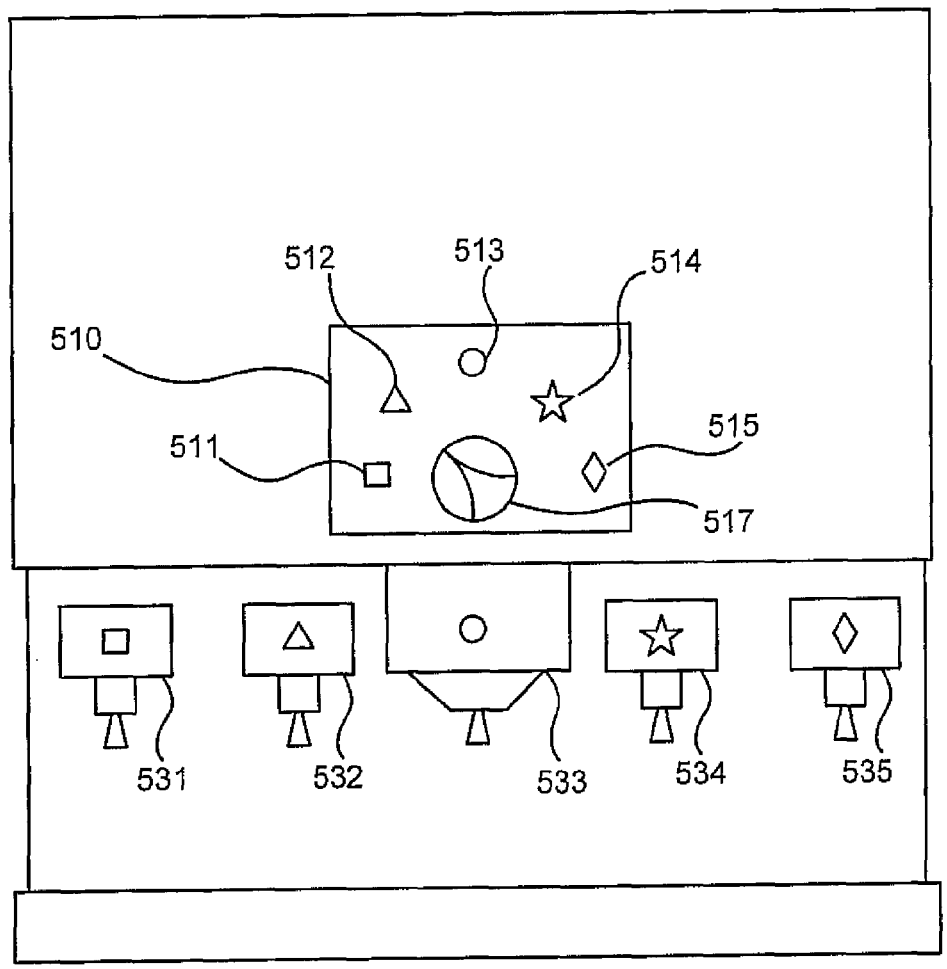
FIG. 5 is a front elevation of a vending machine, in accordance with one embodiment of the present invention.

FIG. 5 shows a front elevation of a vending machine 500, in accordance with one embodiment of the present invention. Vending machine 500 works the same as vending machine 100, but utilizes different ice and beverage selectors and dispensers. In one embodiment, vending machine 500 comprises a rotary ice type selector 510 and a plurality of dispensing devices (531, 532, 533, 534, and 535). Dispensing devices 531, 532, 534, and 535 each dispense one of a plurality of beverages. In one embodiment, dispensing device 533 dispenses a plurality of ice types. In another embodiment, dispensing device 533 dispenses a plurality of ice types and one beverage type.

The vending machine 500, also has ice type selector 510, which is comprised of a rotatable selector knob 517, that can be rotated to select from a plurality of ice types. Other embodiments could use other methods for selecting ice; the important thing is that a user can choose what type of ice is vended. The plurality of ice types are represented by symbols (511, 512, 513, 514, and 515) that are aligned with the stopping points of the selector knob 517. Each of the symbols 511-515 represents a different ice type. There are four beverage dispensing devices (531, 532, 534, and 535) and one ice dispensing device 533. In one embodiment, the ice dispensing device 533 can also dispense one beverage, such as water. In one embodiment, the symbols from the ice selector 510 directly correspond to beverages available from the dispensing devices 531-535. For instance, in one embodiment, by rotating the selector knob 517 to the position represented by the square 511, ice enhanced with the beverage represented by the square 531 will be selected for dispensing from the dispensing device 531. If the square symbol represented a carbonated soda such as cola, then cola flavored carbonated soda would be dispensed from the dispenser with the square 531, and cola soda flavored enhanced ice would be selected for dispensing from the ice dispensing device 533 by turning the selector knob to the square symbol 511 and pushing a container under the dispensing device 533. Likewise for beverages and sodas represented by the triangle, circle, star, and diamond. In other embodiments names or brand names of beverages and sodas would be used in place of the symbols on the dispensers 531-535 and the symbols 511-515 on the ice selector 510 to convey the same meaning. For instance, instead of a square to represent cola (511/531), an embodiment could have the word Coca-Cola, or the symbol for Coca-Cola. Likewise the other symbols 512-515 on the ice selector 510 and the other symbols on the dispensing devices 532-535 would also be replaced with the name or symbol of a beverage or soda that is dispensed or beverage/soda flavored ice that is selected.

In another embodiment, the types of ice on the ice selector 510 would not correspond with the beverage types dispensed. For instance, standard beverage types would be dispensed, and a plurality of enhanced ices would be dispensed that contained enhancements like flavors, colors, caffeine, alcohol, or nutritional supplements such as electrolytes. In such an embodiment, different symbols would be utilized on the ice selector 510 than on the dispensing devices 531-535.

In another embodiment, by rotating the selector knob 517 to the position represented by the square 511, ice enhanced with the beverage/soda 531 represented by the square and frozen in the shape of a square will be dispensed. In such an embodiment, each shape (511-515) would represent not only a shape of ice, but also an ice enhanced with a beverage or soda corresponding to the symbol (511-515). For instance in one embodiment, the square 511 represents cola soda 531 and cola flavored soda square ice 511; the diamond 512 represents fruit punch 532 and fruit punch flavored triangular ice 512; the circle 513 represents water 533 and plain ice with a circular shape 513; the star 514 represents root beer soda 534 and root beer soda flavored star shaped ice 514; and the diamond 515 represents tea 535 and tea flavored diamond shaped ice 515. In other embodiments the name of a beverage could appear inside of a symbol that represented an ice shape. For instance, in such an embodiment, the word Coca-Cola could appear inside the square symbol on the dispensing device 531 and inside the square symbol 511 on the ice selector 510. Likewise, in such an embodiment, the names of other beverages would appear inside the other symbols on the dispensing devices (532-535) and on the other symbols (512-515) on the ice selector 510. It should be understood that other shapes and other beverages can be used in other embodiments of the present invention.

Figure 6:
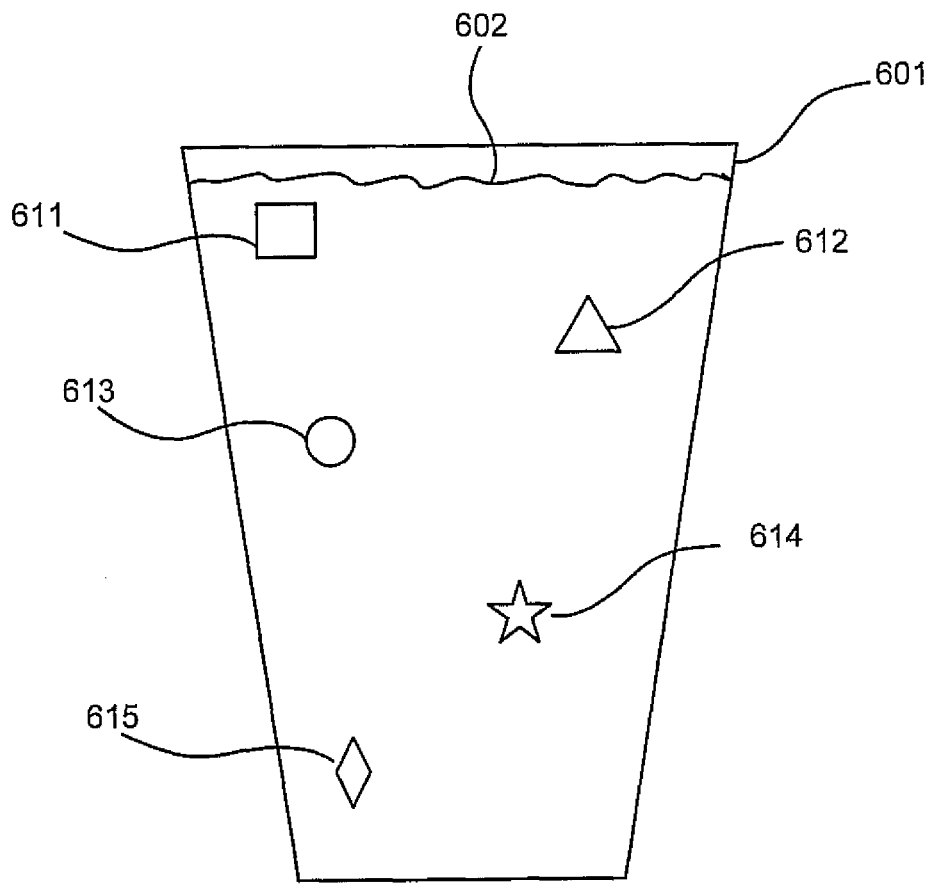
FIG. 6 is a front elevation of a clear beverage container, filled with a beverage and a plurality of ice types, in accordance with one embodiment of the present invention.

FIG. 6 shows a front elevation of a clear beverage container, filled with a beverage and ice, in accordance with one embodiment of the present invention. The container 601 contains a clear beverage 602, and a plurality of ice types (611, 612, 613, 614, and 615) that can be seen through the clear container 601. FIG. 6 displays several things that can take place in different embodiments of the present invention. It should be noted that the ice types can come in a plurality of different shapes, or, in other embodiments different ice types can all come in a uniform shape instead of different shapes.

In one embodiment shown by FIG. 6, several different types of enhanced ice (611-615) can be added to a container, the container can then be filled with one or more beverages. As the enhanced ice types (611-615) melt, each ice type will add a different characteristic to the beverage. In some embodiments, as ice types melted, new flavors and/or colors would be created. For instance, if one ice type 611 contains a flavoring such as cherry flavoring, the beverage 602 will become cherry flavored as that ice type 611 melts. If another ice type 612 contains a nutritional supplement such as electrolytes, the beverage will become infused with electrolytes as that ice type 612 melts. If another ice type 613 contains a stimulant such as caffeine, the beverage will become infused with caffeine as that ice type 613 melts. If another ice type 614 contains coloring such as lime green, the drink will turn lime green as that ice type 614 melts. If another ice type 615 is comprised of the same beverage as the beverage 602 in the container 601, the beverage flavor will be sustained as that ice type 615 melts. An adult might fill a container with different ice types with different enhancing features to get the enhancing features of each of the ice types, while a child or teenager might fill a container with different ice types simply for the bizarre and possibly grotesque flavor and color combinations that could happen when the ice types melted and combined with the beverage in the container.

In another embodiment shown by FIG. 6, each of the different ice types (611-615) contains a different enhancing agent that causes each ice type (611-615) to have a different specific gravity. Having different specific gravities would cause the ice types (611-615) to float at different levels within a beverage 602. When dispensed into transparent container it would be interesting for a person to see each different type of ice 611-615 at a different height within the beverage 602. In another embodiment, the ice types 611-615) all have a specific gravity that causes them to be neutrally buoyant in a beverage 602 and evenly dispersed throughout a beverage 602. In one embodiment, these neutrally buoyant ice types are made in the shape of globes 613 that are small enough to be sucked through a straw. In embodiments of ice types that are neutrally buoyant, or have various specific gravities, other enhancements such as favors and colors can also be added.

In another embodiment each of the different ice types (611-615) comprises a different type of alcohol and the beverage 602 comprises a mixer that the ice types (611-615) are mixed with. Having different alcohol types (e.g., tequila, rum, whiskey) of ice would allow for creating very cold mixed drinks which would not get watered down as the ice melted. In some embodiments of the present invention, some alcohol types may not be easily frozen into ice, in which case those alcohol types will be used as a liquid center of an ice that has a void in the middle for holding liquids. The ice surrounding the alcohol types can be plain ice or enhanced ice.

Figure 7:
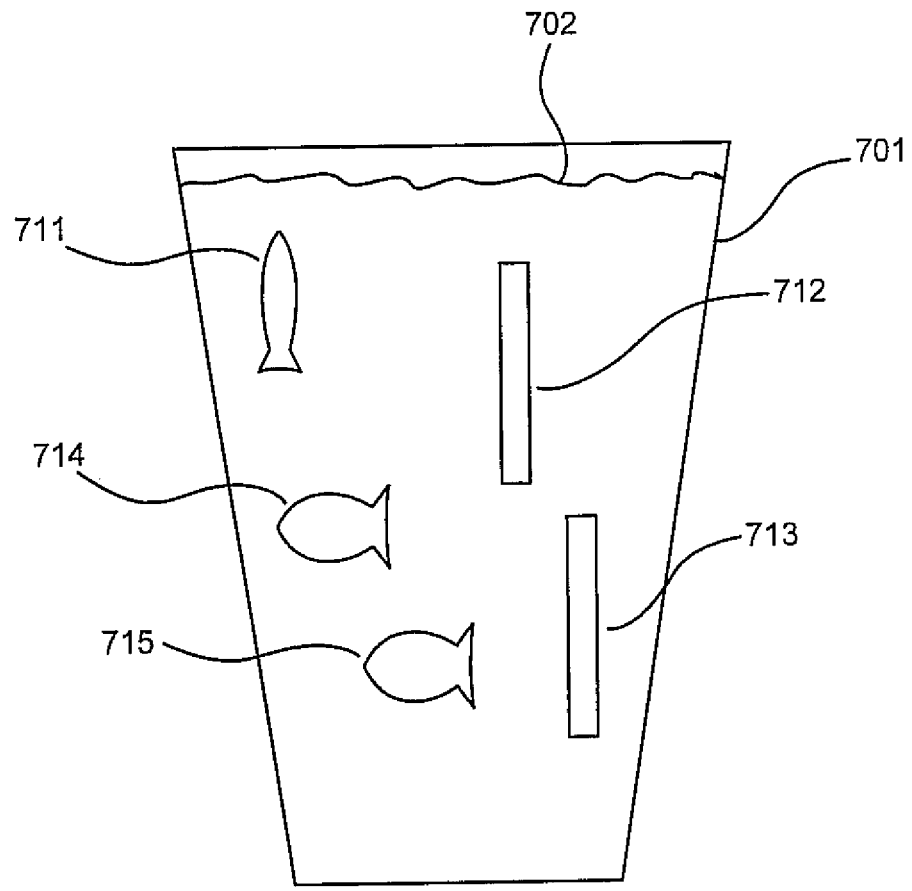
FIG. 7 shows a front elevation of a clear beverage container, filled with a beverage and ice types, in accordance with one embodiment of the present invention.

FIG. 7 shows a front elevation of a clear beverage container, filled with a beverage and ice, in accordance with one embodiment of the present invention. The container 701 contains a clear beverage 702, and a plurality of ice types (711, 712, 713, 714, and 715) that can be seen through the clear container 701. FIG. 7 displays several things that can take place in different embodiments of the present invention. It should be noted that the ice types could come in a plurality of different shapes other than those shown, or, in other embodiments different ice types could all come in a uniform shape instead of different shapes.

In one embodiment, ice type 711 is shaped like a rocket. Ice type 711 is made to float with a certain orientation, namely vertically. This is done by varying the density of the ice with different enhancing agents so that one end is denser than the other, or by adding voids within the ice, such that one end is denser than the other.

In one embodiment, ice types 712 and 713 are shaped like cylinders. Ice types 712 and 713 are made to float with a specific orientation, namely vertically. This is done by varying the density of the ice with different enhancing agents so that one end is denser than the other, or by adding voids within the ice, such that one end is denser than the other. The cylinders (712 and 713) show that by making similar shapes of ice, with different densities, some embodiments of the present invention will comprise ice that floats at different levels within the beverage 702. Cylinder shaped ice (712 and 713) can also be made hollow, or with a void in the center that can be filled with air or enhancing agents. Cylinder shaped ice can also be made in layers with different colors to achieve the effect of a rainbow or other multi-colored pattern. Other shapes, such as rockets, fish and other types, can also be made in layers or multi-colored patterns.

In one embodiment, ice types 714 and 715 are shaped like small fish. Ice types 714 and 715, are similar to ice types 711-713 in that they can be made to float with a certain orientation or at different levels within a drink. Ice types 714 and 715 also represent a simple shape that can be molded in a single long rod of ice, and then sliced into smaller pieces (shown in FIG. 8). This is not limited to fish shapes. Many other simple shapes of ice can also be made in this way.

Figure 8:
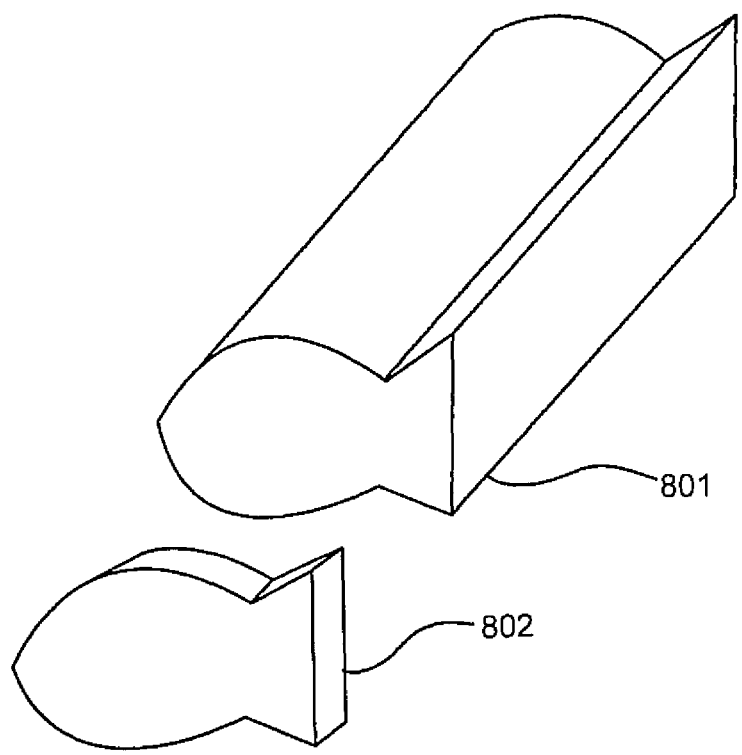
FIG. 8 shows a perspective view of a rod of ice, in accordance with one embodiment of the present invention.

FIG. 8 shows a perspective view of a rod of ice, in accordance with one embodiment of the present invention. The rod of ice 801 is frozen, in accordance with embodiments of the present invention. The rod 801 is a single long piece that is then sliced into smaller pieces 802, which are stored or dispensed in accordance with embodiments of the present invention. The cross-section of the rod 801 is in the shape of a fish. However, this technique is not limited to fish shaped ice rods 801. It can also be used with other shapes such as stars, cubes, cylinders, or any ice shape that is conducive to production as a long rod 801 that can be sliced into pieces 802. In some embodiments of the present invention, the rod 801 can be made with a hollow center that can be filled with an enhancing agent. In some embodiments of the present invention, the rod 801 can be formed of multiple layers, with each layer containing a different enhancing agent.

Figure 9:
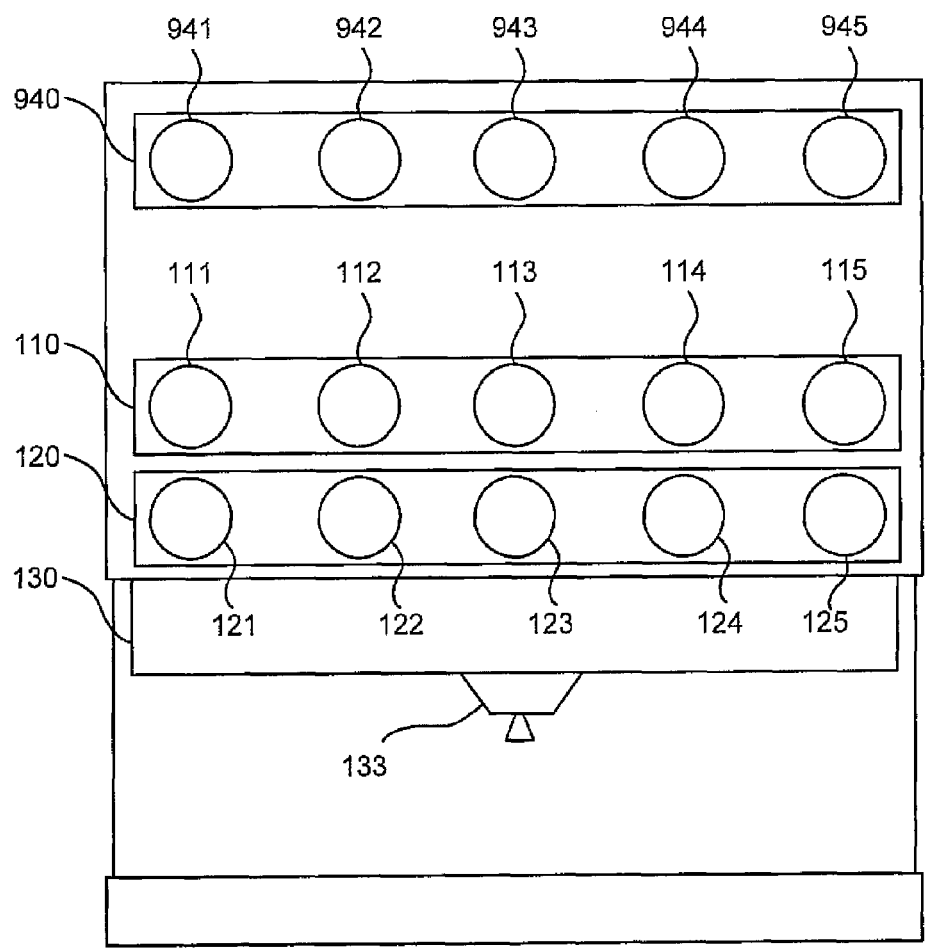
FIG. 9 shows a front view of a vending machine, in accordance with one embodiment of the present invention.

FIG. 9 shows a front view of a vending machine, in accordance with one embodiment of the present invention. The vending machine 900 operates in a similar fashion to the vending machine 100 shown and described in conjunction with FIG. 1, FIG. 2, and FIG. 3. The difference is that a supplement selector 940, containing a plurality of supplement selector buttons (941, 942, 943, 944, and 945) has been added to vending machine 900, and optionally, a separate supplement store may be added within the beverage store 240 (shown in FIG. 2), or external to vending machine 900. Although five supplement selector buttons are shown, embodiments can have more or less. Addition of the supplement selector 940, allows the vending machine 900 to dispense supplements from the dispensing device 133 in the dispenser 130. When a particular supplement button (941 for instance) is selected, a supplement, such as vitamin C, is available to be dispensed from the dispensing device 133. Beverages are dispensed by selecting a beverage selector button (121-125) on the beverage selector 120. Ice types are dispensed by selecting an ice type selector button (111-115) on the ice type selector 110. The supplements dispensed are things such as vitamins, minerals, electrolytes, protein, herbs and herbal extracts and other health or nutrition enhancers. Dispensing supplements is useful for vending machines in environments such as gyms, health clubs, or restaurants. Other embodiments of vending machine 900 can comprise different beverage selectors 120, different ice type selectors 110, and different supplement selectors 940. Additionally, other embodiments of vending machine 900 can have more dispensing devises 133, different types of dispensing devices, and/or separate dispensing devices for ice, beverages, and supplements. The supplements dispensed can be the same as the supplements utilized as enhancing agents for creation of enhanced ice, or different supplements. Some embodiments of vending machine 900 can vend beverages and supplements, but not ice. In such embodiments, the ice type selector 110 and its associated buttons (111-115) would be removed.

Referring now to FIG. 1, FIG. 2, FIG. 3, FIG. 4, FIG. 5, FIG. 9, and the various embodiments of the present invention. A plurality of different ice types can be made and/or vended by the embodiments of this invention. In addition to plain ice and beverages frozen into ice, enhanced ice types comprised of a liquid mixed with one of more of a plurality of different enhancing agents such as flavors, colors, beverages, beverage syrups, nutritional supplements (e.g., vitamins, minerals, protein, calcium, herbal extracts, electrolytes), stimulants (such as caffeine), alcohols, or sodas can be vended. In some embodiments, the ice types have a hollow void that is filled with alcohol, liquid, air, or one or more enhancing agents. In some embodiments the ice types have multiple layers, with each layer containing a different enhancing agent. In some embodiments, the vending machine makes the ice types that are vended with an ice making mechanism 260 as previously described, and then stores the ice types in the ice store 250 for storage until they are selected with the ice selector 110 for dispensing with the dispenser 130. In other embodiments, the ice types are made separately from the vending machine, and loaded into the ice store 250 of the vending machine for storage until they are selected with the ice selector 110 for dispensing with the dispenser 130. In some embodiments, the plurality of ice types can be flash frozen as previously described. In some embodiments, the plurality of ice types can come in a plurality of different shapes. In some embodiments, a portion of the plurality of different ice types can be crushed or shaved prior to dispensing.

Figure 10:
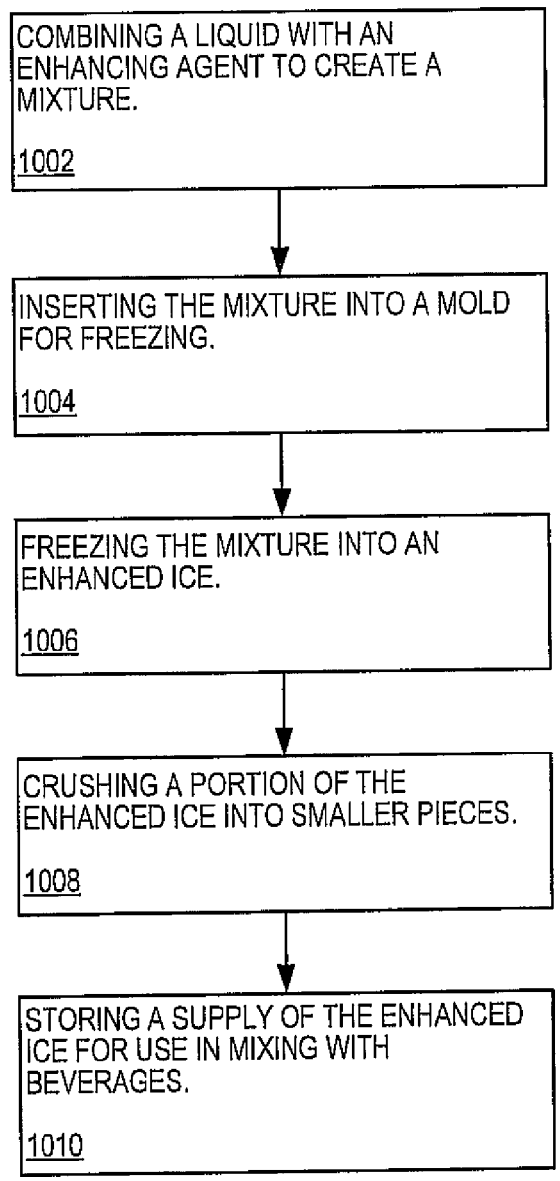
FIG. 10 is a flowchart of a method of making ice according to one embodiment of the present invention.

FIG. 10 shows a flowchart 1000 of a method for making ice, according to one embodiment of the present invention.

In block 1002 of FIG. 10, one embodiment provides combining a liquid with an enhancing agent to create a mixture. In this block, a liquid such as water, soda, milk, tea, coffee, fruit juice, sports drink, or any other known consumable liquid or beverage is mixed with one or more enhancing agents. Enhancing agents are items such as a flavoring, coloring, nutritional supplement (e.g., vitamins, minerals, protein, calcium, electrolytes), stimulant (such as caffeine), beverage syrup, or another liquid. In this combining stage liquids and enhancing agents are introduced into a combiner area where they mix on their own, or can be actively mixed with one another.

In block 1004 of FIG. 10, one embodiment provides placing the mixture into a mold for freezing. In this block, the liquid that has been mixed with one or more enhancing agents is placed in a mold for freezing. This can be a mold of any conventional type known to those skilled in ice making. It can be a mold that makes simple cube type shapes, round shapes, or cylindrical shapes; or it can be a fancy mold that makes ice in shapes like stars, rockets, fish, or animals, or makes ice with holes in the ice pieces. It can also be a mold that creates an ice piece with a solid exterior surface surrounding a void that can be filled with a liquid, which may or may not be frozen. This is useful for making multi-layered ice types where each layer has a different enhanced quality. It is also useful for making ice that serves as a container for a liquid such as a type of alcohol. It is also useful for making ice with different buoyancies. It is also useful for making ice that floats with a specific level or orientation within a drink. For instance, rocket shaped ice can be made to float with the fins down, different colors of fish can be made that float at different levels within a drink, or cylindrical ice can be made that floats vertically instead of horizontally.

In block 1006 of FIG. 10, one embodiment provides for freezing the mixture into an enhanced ice. In this block, the mixture of a liquid and one or more enhancing agents is frozen. A freezer or any conventional means known to those skilled in making ice can do the freezing. It can also be done rapidly by incorporating the use of a compressed gas such as carbon dioxide or liquid nitrogen in the freezing process to speed the freezing. Speeding the freezing process along is useful so that the ice can be made as needed or so that the ice can be made faster if a store of it has been greatly diminished.

In block 1008 of FIG. 10, one embodiment provides for crushing a portion of the enhanced ice into smaller pieces. Crushing the enhanced ice types with a crusher is useful in several cases. In one case, a plurality of ice sizes can be provided if a portion of the ice is crushed, thus allowing a beverage to be filled with ice of varying sizes. Some smaller pieces would melt quickly, while larger pieces would last longer before being completely melted. In other instances, a portion of the ice can be crushed so that ice of a more or less uniform but finer size can be created. Many people desire crushed ice because it melts quickly, and also because it is easy to eat. Another use for very finely crushed ice, or shaved ice, would be for things like snow cones. This would be useful, because the enhanced ice would have different properties than the plain ice normally used for making snow cones. For instance, the ice used for a snow cone could be pre-flavored, pre-colored, fortified with a nutritional supplement, or made from a liquid other than water, such as milk or tea.

In block 1010 of FIG. 10, one embodiment provides for storing a supply of the enhanced ice for use in mixing with a beverage. The storage area or hopper can be made in a conventional manner of ice storage hoppers and can also be segmented to hold a plurality of different ice types. A supply of enhanced ice is useful for having the ice available when it is needed or desired. It also prevents the need to wait for ice to be produced. Mixing the enhanced ice with a beverage is useful, because as the enhanced ice melts, a beverage will not be watered-down as it is when plain ice melts, but instead become enhanced in some way. For instance, cherry flavored enhanced ice would give a cola soda a cherry flavor as it melted. In another instance, cola soda flavored enhanced ice would sustain the cola flavor of a cola soda as it melted, rather than watering it down. In yet another instance, yellow enhanced ice and blue enhanced ice could be added to a colorless drink, and as the colored enhanced ices melted, the beverage would turn a darker and darker shade of green.

Figure 11:
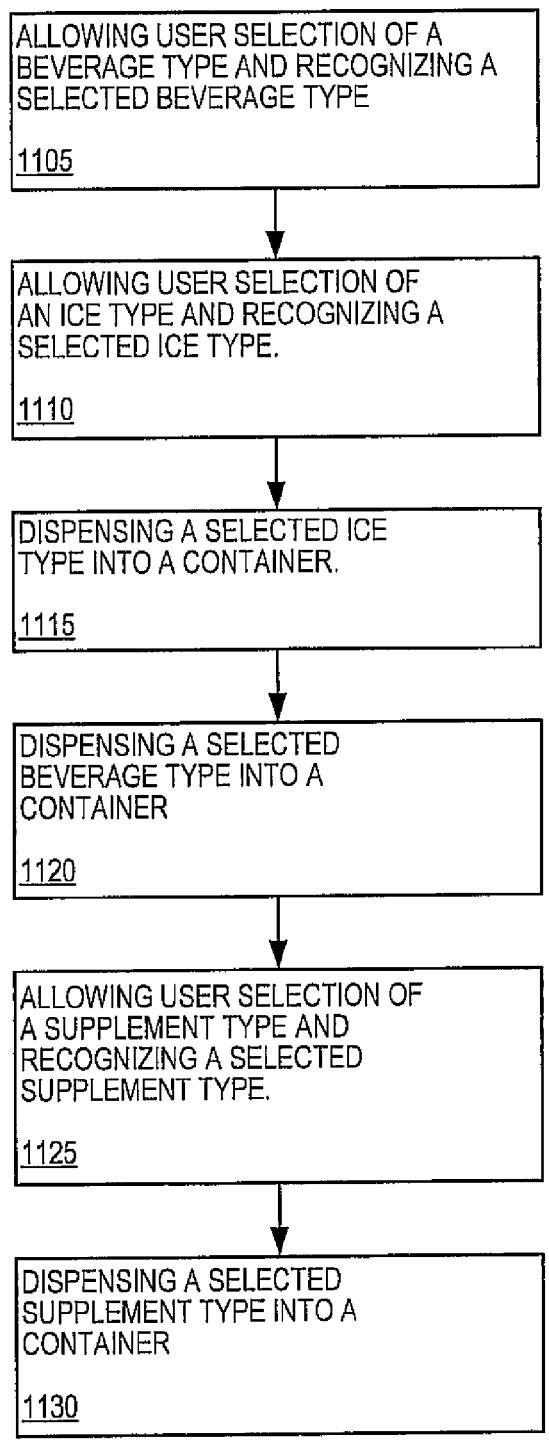
FIG. 11 is a flowchart of a method of vending ice and beverages according to one embodiment of the present invention.

FIG. 11 shows a flowchart 1100 of a method of vending ice and beverages. In one embodiment, block 1105 provides for allowing a user selection of a beverage type and recognizing a selected beverage type. A user selects a beverage type from a plurality of beverages dispensed by the vending machine. This requires user interaction with some form of a selector device such as a touch screen, button, switch, knob, slider, or other selector device.

In one embodiment, block 1110 provides for allowing a user selection of an ice type and recognizing a selected ice type. A user selects an ice type from a plurality of ice types dispensed by the vending machine. This requires user interaction with some form of a selector device such as a touch screen, button, switch, knob, slider, or other selector device. In some embodiments, the ice type is made in the vending machine and stored until it is selected and ultimately dispensed. In some embodiments, the ice type is flash frozen after it is selected for vending from a plurality of ice types. In some embodiments, the ice type is made external to the machine, and loaded into an ice store for selection and dispensing. A plurality of ice types can be selected for dispensing by the various embodiments of this method. In addition to plain ice, enhanced ice types can be selected for dispensing. Enhanced ice types may contain enhancements like beverage syrup concentrate, flavors, colors, caffeine, alcohol, or nutritional supplements such as electrolytes. In some embodiments, crushed ice, shaved ice, and/or ice of different shapes, sizes, and buoyancies can also be selected for dispensing. In addition, ice with multiple enhancements, multiple layers, or a liquid filled center can also be selected in some embodiments.

Block 1115 provides allowing for dispensing a selected ice type into a container. The ice type that is selected by the user from a plurality of selectable ice types is dispensed into a container in response to the selection. In one embodiment, the selected ice type is obtained from an ice storage area inside the vending machine and then dispensed. In one embodiment, ice types are made inside the vending machine and stored until selected, obtained, and dispensed. In another embodiment, ice types stored in the vending machine are made external to the vending machine then loaded into the vending machine for selection and dispensing into containers. In another embodiment, ice types are made via flash freezing after being selected and before being dispensed into a container. In some embodiments ice types can also be crushed or shaved before being dispensed into a container. In some embodiments, the vending machine has a single dispensing device for dispensing selected ice types. In other embodiments, the vending machine has multiple dispensing devices for dispensing selected ice types.

Block 1120 provides allowing a selected beverage type into the container. A beverage type selected from a plurality of selectable beverage types is vended into a container in response to the selection. The beverage can be dispensed from a beverage storage area within the vending machine or from an external beverage store that is connected to the vending machine. In some embodiments, beverages and ice types can be dispensed into containers from the same dispensing device. In some embodiments, beverages and ice types are dispensed from separate dispensing devices. In some embodiments, the vending machine has one dispensing device for dispensing selected beverage types. In some embodiments, the vending machine has a plurality of dispensing devices for dispensing selected beverage types.

Block 1125 provides allowing user selection of a supplement type and recognizing a selected supplement type. This allows for selection of a supplement type to be dispensed. The supplements dispensed can be the same supplements used as enhancing agents for making enhanced ice, or they can be different supplements. Supplements constitute such things as vitamins, minerals, electrolytes, protein, calcium, herbs and herbal extracts and other substances that provide a health or nutrition benefit.

Block 1130 provides dispensing a selected supplement type into a container. After being selected, the supplements are dispensed. The supplements can be dispensed from the same dispensing devices that dispense ice types and/or beverage types, or they can be dispensed from one or more separate dispensing devices.

While the methods of the embodiments illustrated in flowcharts 1000 and 1100 show a specific sequence and quantity of steps, the present invention is suitable to alternative embodiments. For example, not all of the steps provided for in the method are required for the present invention. Furthermore, additional steps can be added to the steps presented in the present embodiment. Likewise, the sequences of the steps can be modified depending on the application.

Embodiments of the present invention, a method and system for making and vending ice associated with liquid beverages are thus described. While the present invention has been described in particular embodiments, it should be appreciated that the present invention should not be construed as limited by such embodiments, but rather construed according to the following claims.

What is claimed is:

1. A method of vending ice and beverages, said method comprising:
recognizing a first user selection of a beverage type;
recognizing a second user selection of an ice type;
accessing ice from a hopper segmented into a plurality of areas, wherein each area of said hopper is associated with a respective type of ice;
responsive to said second user selection, dispensing ice of said selected ice type; and
responsive to said first user selection, dispensing a beverage of said selected beverage type.

2. The method of claim 1 further comprising:
obtaining said selected ice type from an ice storage area.

3. The method of claim 1 further comprising:
creating said ice of said selected ice type.

4. The method of claim 1, wherein said ice of said selected ice type comprises a frozen mixture of a liquid and an enhancing agent.

5. The method of claim 4, wherein said enhancing agent comprises at least one of a beverage syrup, a flavoring, a caffeine additive, alcohol, a nutritional supplement, an electrolyte additive, and a food coloring.

6. The method of claim 4, wherein said selected ice type is characterized by said enhancing agent of said ice.

7. The method of claim 1, wherein said selected ice type comprises at least one of a beverage syrup enhanced ice type, a flavor enhanced ice type, a caffeine enhanced ice type, an alcohol enhanced ice type, a nutritional supplement enhanced ice type, an electrolyte enhanced ice type, and a food coloring enhanced ice type.

8. The method of claim 1 further comprising:
dispensing said ice and said beverage into a container.

9. The method of claim 1 further comprising:
recognizing a user selection of a supplement type; and
in response to said supplement type selection, dispensing a supplement of said selected supplement type.

10. The method of claim 1, wherein said supplement comprises at least one of a beverage syrup, a flavoring, a caffeine additive, alcohol, a nutritional supplement, an electrolyte additive, and a food coloring.

11. A method of vending ice and beverages, said method comprising:
recognizing a plurality of user selections, wherein said plurality of user selections comprise a first user selection of a beverage type and a second user selection of an ice type;
accessing ice from a hopper segmented into a plurality of areas, wherein each area of said hopper is associated with a respective type of ice; and
responsive to said plurality of user selections, dispensing ice and a beverage, wherein said ice is of said ice type, and wherein said beverage is of said beverage type.

12. The method of claim 11 further comprising:
obtaining said selected ice type from an ice storage area.

13. The method of claim 11 further comprising:
creating said ice of said selected ice type.

14. The method of claim 11, wherein said ice of said selected ice type comprises a frozen mixture of a liquid and an enhancing agent.

15. The method of claim 14, wherein said enhancing agent comprises at least one of a beverage syrup, a flavoring, a caffeine additive, alcohol, a nutritional supplement, an electrolyte additive, and a food coloring.

16. The method of claim 14, wherein said selected ice type is characterized by said enhancing agent of said ice.

17. The method of claim 14, wherein said selected ice type comprises at least one of a beverage syrup enhanced ice type, a flavor enhanced ice type, a caffeine enhanced ice type, an alcohol enhanced ice type, a nutritional supplement enhanced ice type, an electrolyte enhanced ice type, and a food coloring enhanced ice type.

18. The method of claim 11 further comprising:
dispensing said ice and said beverage into a container.

19. The method of claim 11 further comprising:
recognizing a user selection of a supplement type; and
in response to said supplement type selection, dispensing a supplement of said selected supplement type.

20. The method of claim 11, wherein said supplement comprises at least one of a beverage syrup, a flavoring, a caffeine additive, alcohol, a nutritional supplement, an electrolyte additive, and a food coloring.

* * * * *